United States Patent [19]
Connelly

[11] Patent Number: 5,522,117
[45] Date of Patent: Jun. 4, 1996

[54] MOISTURE PROOF HINGE

[75] Inventor: Jerry D. Connelly, Bluefield, W. Va.

[73] Assignee: Clinch River Corporation, Tazewell, Va.

[21] Appl. No.: 333,346

[22] Filed: Nov. 2, 1994

Related U.S. Application Data

[63] Continuation of Ser. No. 45,215, Apr. 13, 1993, abandoned.

[51] Int. Cl.$^6$ .................................................. F05D 11/00
[52] U.S. Cl. ..................... 16/375; 210/421; 210/456; 16/385
[58] Field of Search ................. 16/375, 385, 223; 210/420, 421, 456, 405

[56] References Cited

U.S. PATENT DOCUMENTS

| | | |
|---|---|---|
| 952,562 | 3/1910 | Durst . |
| 1,745,773 | 2/1930 | Sipe ................................... 16/375 |
| 1,818,267 | 8/1931 | Niks . |
| 2,171,998 | 9/1939 | Trapani . |
| 2,321,753 | 6/1943 | King ................................... 16/385 |
| 2,504,635 | 4/1950 | Bradley ............................. 16/223 |
| 2,555,204 | 5/1951 | Sorrell . |
| 3,222,437 | 12/1965 | Schilling . |
| 3,261,470 | 7/1966 | Daniels . |
| 3,269,358 | 8/1966 | Hawley . |
| 3,441,975 | 5/1969 | Shepherd .......................... 16/385 |
| 3,446,349 | 5/1969 | Benzon . |
| 3,447,199 | 6/1969 | Trimble . |
| 3,490,623 | 1/1970 | Steckelberg ..................... 414/520 |
| 3,703,742 | 11/1972 | Konishi ............................. 16/385 |
| 3,881,303 | 5/1975 | Krafka . |
| 4,026,425 | 5/1977 | Gruodis ........................... 414/299 |
| 4,120,790 | 10/1978 | Tinker ............................. 210/456 |
| 4,167,154 | 9/1979 | Hill .................................. 119/53 |
| 4,202,777 | 5/1980 | Schall ............................. 210/456 |
| 4,545,090 | 10/1985 | Redmond ......................... 16/385 |
| 4,604,195 | 8/1986 | Lintunen . |
| 4,710,296 | 12/1987 | Connolly ......................... 210/420 |
| 4,814,075 | 3/1989 | Connolly ......................... 210/156 |
| 5,279,736 | 1/1994 | Moorhead ....................... 210/421 |

FOREIGN PATENT DOCUMENTS 4113562  10/1961  Japan .

*Primary Examiner*—Daniel C. Crane
*Attorney, Agent, or Firm*—Cushman Darby & Cushman

[57] ABSTRACT

A fluid proof hinge has a first hinge part and a second hinge part connected by a metal pin. The first hinge part has an integral flange of an elastomeric material adjacent to the hinge area, the flange extends along the length of the hinge and protrudes towards the second hinge part. The second hinge part has a receiving portion for the flange also extending along the length of the hinge. The two hinge parts are connected together by the metal pin so that the flange of the first hinge part contacts the receiving portion of the second hinge part to provide a fluid seal on one side of the hinge. The fluid-proof hinge is useful in many applications, specifically as a hinge for a fluid flow control plate in a fluid passageway such as in a passageway from a feed box to a sieve bend.

13 Claims, 2 Drawing Sheets

MOISTURE PROOF HINGE

This is a continuation of application No. 08/045,215, filed on Apr. 13, 1993, which was abandoned upon the filing thereof.

BACKGROUND OF THE INVENTION

1. Field of the Invention

The present invention relates to a moisture proof hinge. More specifically, the invention relates to a moisture proof hinge for use as part of a flexible boundary in a fluid passageway.

2. Description of the Related Art

Hinges are used in a multitude of settings to provide an articulable connection between two structures. Typically, hinges are used to connect components so that the angle between the two components can be changed while maintaining a structural connection. In some applications, articulable connections are needed in fluid systems, for example, particularly as a part of a fluid passage.

Articulable connections have long been required for feed boxes for static sieves, sieve bends or screens of the type shown in FIG. 5. Articulable connections 10 are used to control the flow of fluid from the feed box 40 onto the sieve 45. See for example, the Static Sieve Feed Control of Connolly, U.S. Pat. No. 4,710,296.

In such an assembly, the feed box 40 is a relatively large hollow container for holding a fluid, generally a slurry of solid particles and water. The feed box is filled through an inlet opening 41 and the feed box is emptied, generally, by the force of gravity through an opening 42 in the bottom of the feed box 40. Typical feed boxes are rectangular in shape, much longer than they are deep or wide. A feed box of this shape is suited for distributing the slurry over a wide area through the long slot defined at the bottom of the feed box.

Depending upon the consistency of the slurry to be fed to the sieve, the flow rate of the slurry from the box to the sieve must be controlled. For example, a viscus slurry is often fed at a slower rate than a non-viscus slurry depending upon the performance of the sieve 45. Thus, it is necessary to control the flow of slurry from the feed box.

A conventional control apparatus is disclosed in the aforementioned Connolly patent. That control apparatus, also illustrated in FIG. 5 consists of a discharge spout 43 having a rigid back 44 wall, rigid side walls (not shown), and a control wall having two portions. The upper control wall 46 is rigid and extends downward from the top of the discharge spout which connects with the bottom of the feed box. A lower control wall 47 extends the upper control wall 46 towards the bottom of the discharge spout. The upper control wall 46 and the lower control wall 47 are connected by an articulable connector 10 so that the lower control wall can be angled toward the back to eventually contact the back wall thus closing the discharge spout. The lower control wall is pivoted about the articulable connection by the force of a handle and cam mechanism 48 connected to a discharge spout frame, or by a threaded limit bolt (not shown), which, when turned, presses against the surface of the lower control wall.

The articulable connection in early feed boxes was a conventional straight hinge that extended along the length of the discharge spout and was connected to the upper and lower control wall. However, such connections had the disadvantage that they leaked because slurry would penetrate the joint of the hinge and pass through it to escape the discharge spout. This leakage was more pronounced when the lower control wall portion 47 was displaced to stop the flow from the feed box. In this condition there is substantial pressure forcing fluid through the hinge when the feed box is full.

To address this problem, other articulable connections have been used, as in the Connolly structure. Connolly provided a strip of rubber material, for example polyurethane or like elastomeric flexible material, which extends along the lower edge of the upper control wall and is connected to the upper control wall at spaced locations. A lower edge of the rubber strip is connected to the upper edge of the lower control wall such that the lower control wall is suspended from the wall, not by a hinge, but by the flexible piece of rubber. The continuous piece of rubber seals the gap between the upper and lower control wall and allows the lower control wall to be articulated relative to the upper wall.

However, a deficiency of this connection is that the rubber seal is the only structural connection between the upper and lower control walls and the rubber or other resin material may not have sufficient durability and strength to provide a long term, reliable connector. When the feed box is full of slurry or other fluid and the control wall is closed, there is significant stress on the connector which supports much of the load on the lower control wall. That stress and the repeated flexure of the hinge over time can cause the elastomeric hinge to break down quickly, leading to leaks and eventual failure of the connection, thus requiring time consuming and expensive replacement of the connection.

SUMMARY OF THE INVENTION

An object of the present invention is to provide an articulable connection which is both moisture-proof and strong. More specifically, an object of the invention is to provide a fluid-proof hinge having high strength and high reliability. This and other objects of the invention are accomplished by providing a straight hinge made of an elastomeric material, having a top hinge part with a sealing flange, a bottom hinge part and a hinge pin. The top hinge part is attached to the lower edge of the upper control plate. The top hinge part is a single piece extending at least the entire length of the control plate. The top hinge part has spaced protrusions with slots defined therebetween which extend along its lower edge. The spaced protrusions and slots interface with corresponding protrusions and slots on the upper edge of the lower hinge part which is attached to the upper edge of the lower control wall. The protrusion portions of each hinge part have a through-bore extending in a direction along the length of the hinge. A hinge pin is disposed through the bore in the protrusions to connect the upper and lower hinge parts so that they can articulate about the hinge pin.

The hinge is made waterproof by a flange which is integral with and depends from the lower edge of the upper hinge part. The flange is made of an elastomeric material. A corresponding recessed portion is defined in the lower hinge part. The flange is resiliently deformable and forms a contact seal with the recessed portion along the length of the hinge thus providing a fluid seal therealong. The elastomeric nature of the flange provides a seal with the recessed portion.

Other objects, features, and characteristics of the present invention, as well as the methods of operation and functions of the related elements of structure, and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE INVENTION

Figure 1:
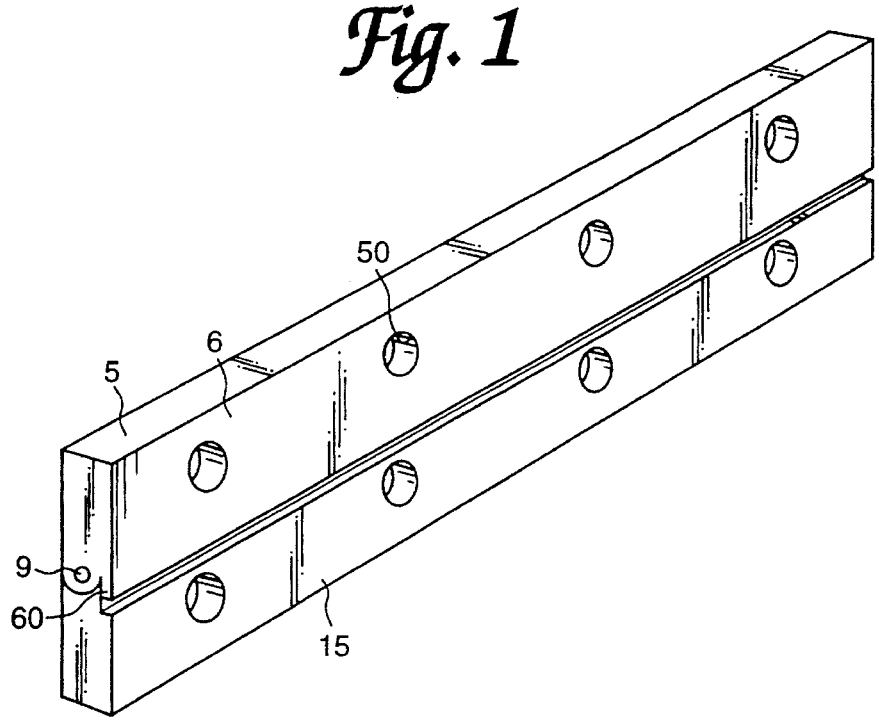
FIG. 1 is an oblique view of the hinge of the present invention.
Figure 4:
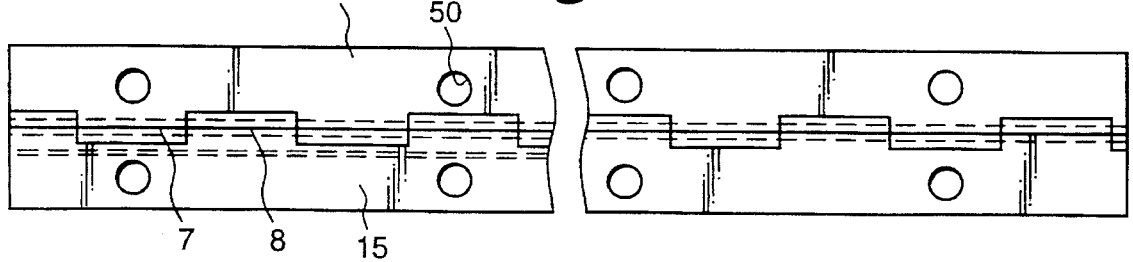
FIG. 4 is an elevation of the hinge of the present invention along line IV—IV.

The hinge of the present invention, depicted in FIG. 1, comprises a top hinge portion 5, a bottom hinge portion 15 and a connecting hinge pin, schematically shown by line 8. The top hinge portion 5 is illustrated in particular in FIG. 4. The top hinge portion 5 is substantially rectangular and extends lengthwise along the joint between two members to be articulably connected. The top hinge portion 5 is coupled to a member by bolts which pass through apertures in the hinge portion. When the hinge portion is attached by bolts to the control wall, the resilient nature of the hinge material allows the hinge to form a fluid seal with the control wall. The spacing of the holes depends upon the sealing performance required. If the hinge is to be operated under high pressure, the holes are spaced closer together to ensure a tight fit with the wall member. Also, the spacing of the holes depends upon the strength requirements of the hinge. If the hinge is to support a large load, closer spacing of bolt holes and more bolts are used to adequately support the hinge. For example, the holes are preferably spaced about 6 inches on center for the hinge of a feed box of the type shown in FIG. 5, and the holes are about 5/8 of an inch in diameter. A sealing gasket (not shown) can be inserted between the hinge and the wall member to aid in the sealing function.

The lower edge of the top hinge portion 5 is a connecting portion. The connecting portion includes protruding portions 7 and slot portions which extend alternately along the length of the hinge. The protruding portions have a bore 9 extending through the protrusions parallel to longitudinal axis of the hinge.

A lip seal portion 60 is also defined along the length of the top hinge portion 5, adjacent the protrusions and slots. The lip seal portion 60 is integral with the top hinge portion 5. The lip seal 60 is thin relative to the thickness of the hinge, therefore, the protrusions and slot sections which comprise the majority of the width of the hinge are offset only slightly, in the thickness direction, to one side of the hinge.

The bottom hinge portion 15 of the hinge is shaped similarly to the top hinge portion. However, rather than a lip seal portion, the bottom hinge portion 15 has a recessed receiving portion 70 for receiving the lip seal portion 60. The bottom section has protruding and slot portions similar to those of the top section such that the protruding portions of the top section fit within the slot portions of the bottom section 15. When the two sections are assembled, the bore, defined through the alternating protruding portions of the top hinge portion and the bottom hinge portion, extends the length of the hinge. A metal pin schematically shown at 8, preferably of stainless steel, is inserted through the bore 9, thus connecting the upper and lower hinge portions.

Figure 5:
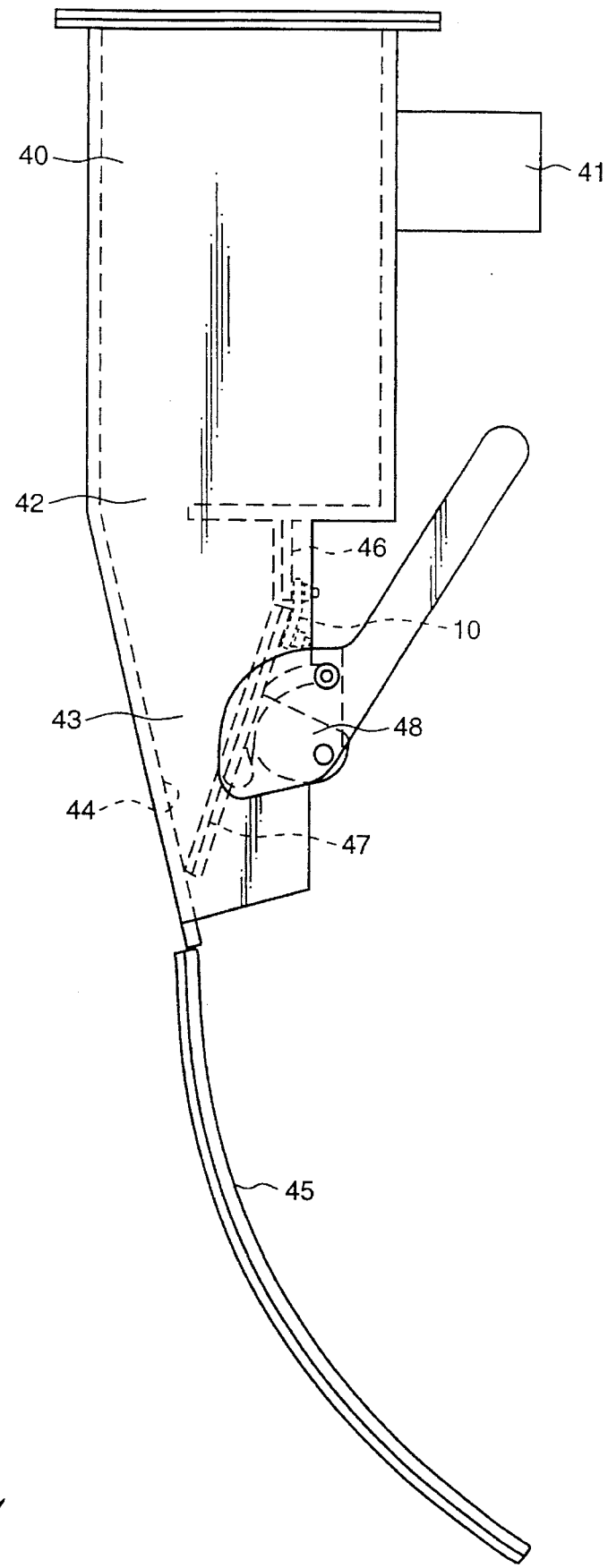
FIG. 5 is a schematic view of a device to which the hinge of the present invention may be adapted.

The steel pin provides the strength necessary to support the structural loads while also serving as the articulating joint member. The lower hinge portion also has a series of spaced holes 50 for attaching the lower section to a second control wall 47. See for example, the movable wall of the feed box as shown in FIG. 5. It should be recognized that the dimensions of the hinge may be altered as appropriate for the particular application of the hinge. The preceding and following description of dimensions serve as an example for a particular application of the hinge.

The length of the protruding and slot portions of the connecting portions of the example embodiment are in the range of about 1 to 3 inches, but preferably about 2 inches. The width of each of the upper and lower hinge sections is in the range of 1 to 3 inches, but preferably about 1 3/8 inches measured from an edge of the section to the center of the bore in the hinge portion. Thus, the width of the entire hinge is about 3 1/4 inches. The length of the protruding and slot portions and the width of the hinge may of course be altered to provide for the proper strength depending upon the size of the hinge and pin.

The length of the hinge depends upon the length of the articulating connection that must be sealed. For example, the hinge for a 3 foot long feed box as shown in FIG. 5 is about 29 inches long and a hinge for an 8 foot long feed box is approximately 89 inches long. A hinge having the length in the range described above may have a thickness of 1/2 to 1 inch. The thickness of the hinge depends upon the diameter of the hinge pin and the desired strength characteristics of the hinge connecting and mounting portion. For a feed box hinge as shown in FIG. 5, the thickness of the hinge is about 3/4 of an inch and the metal hinge pin and the receiving bores have a diameter of about 1/6 of an inch. The pin may be made of any rigid material, but ideally, is made of metal and preferably, stainless steel.

Figure 2:
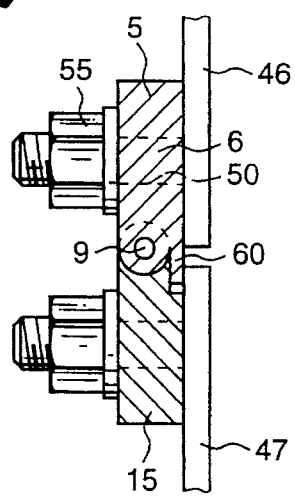
FIG. 2 is a cross-section of the hinge of the present invention in an open position.
Figure 3:
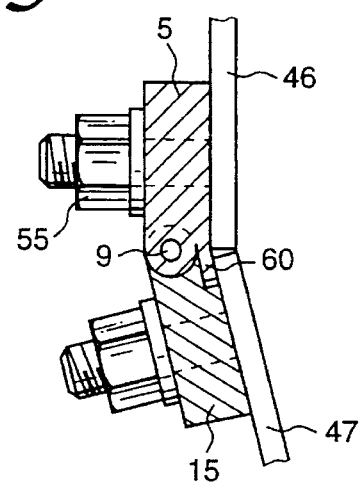
FIG. 3 is a cross-section of the hinge of the present invention in a closed position.

The hinge assembly as described above is moisture-proof from the side of the hinge having the lip seal and receiving portion. When assembled and attached to two separate rigid members, the lip seal 60 is biased against the receiving portion 70 of the lower hinge section when the hinge is in the open position as shown in FIG. 2. In this condition, fluid is sealingly prevented from passing into the hinge by the contact between the lip seal and the receiving portion which extends along the length of the hinge. As the hinge is articulated as shown in FIG. 3, the lip seal 60 is deflected by the receiving portion 70 and continues to remain in sealing contact with the receiving portion 70. Further, the more the hinge is articulated, the more forcefully the lip seal 60 is pressed into contact with the receiving portion by the elastic forces resulting from the deflection of the lip. Therefore, the hinge is fluid-proof while still providing articulating motion. Additionally, the hinge is quite strong because the connection function is provided by the stainless steel hinge pin.

The lip seal may be formed on either the top section or the bottom section and the recessed portion may also be formed on either corresponding section. A second lip seal and recessed portion located on the other side of the hinge could be added, and would provide a dual sealing function and would seal the hinge from fluid pressure on the other side of the hinge.

The lip seal 60 is preferably formed integrally with the top hinge portion. Alternatively, the lip seal 60 may be made of a different material having the desired strength, stiffness and sealing characteristics for a particular application. Thus, the lip may be adhered or attached by other means to the hinge section. The width of the lip seal 60 in a direction towards the receiving portion 70 depends upon the range of motion of the hinge and the width of the receiving portion. As the hinge is articulated from the open position of FIG. 2 to the closed position of FIG. 3, the lip seal 60 extends further onto the receiving portion 70 of the lower section. Accordingly, the receiving portion 70 should be deeper for a hinge requiring a large range of articulation.

As presented above, the hinge of the present invention provides a fluid-proof function by means of the lip seal 60 and the receiving portion 70 which seal the rest of the hinge from fluid on the lip seal side of the hinge. In addition to the fluid-proof function, the hinge is also strong because the hinge pivots about a stainless steel pin which bears the stresses applied between the two sections of the hinge. Additionally, because the upper and lower sections of the hinge are connected by a stainless steel pin, the lip seal can be made of a material most appropriate for creating a seal for the hinge rather than a material to provide the structural support between the two hinge portions. Thus, the above described invention is a fluid-proof hinge device having good strength characteristics which ensures a long working life without leaking or structural failure of the hinge.

Although the hinge of the present invention has application in a broad variety of fields, the hinge is particularly suited as a hinge for a feed box for a sieve bend as shown in FIG. 5. The feed box 10 has a discharge passage having a movable front wall 47 which is angled towards the rear wall 44 to stop the flow of fluid from the box. The hinge 10 of the present invention provides an effective seal to prevent fluid from escaping the box through the hinge while also supporting the large loads associated with a large volume of fluid above the hinge.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. A fluid proof hinge comprising:

a first hinge part having first and second longitudinal ends, a top edge portion, a bottom edge portion, a front face and a back face, a plurality of alternating protrusions and slots defined along the bottom edge portion, and a flange portion integrally formed in one piece with said first hinge part so as to depend from the bottom edge portion, adjacent the protrusions and slots, said first hinge part, including said flange portion, being integrally formed in one piece from an elastomeric material, said first hinge part and flange both being of the same elastomeric material;

a second hinge part having first and second longitudinal ends, a top edge portion, a bottom edge portion, a front face and a back face, a plurality of alternating protrusions and slots defined along the top edge portion, the top edge having a recess defined therein along the top edge portion adjacent the protrusions and slots, the second hinge part being integrally formed in one piece from an elastomeric material; and a pin member connecting the alternating protrusions of the first and second hinge parts, such that when the first and second hinge parts are connected by the pin member the flange portion of the first hinge part sealingly contacts the receiving portion of the second hinge part so as to define a fluid tight seal therebetween.

2. A fluid proof hinge as in claim 1, wherein the first and second hinge parts each further comprise a plurality of mounting holes whereby the first and second hinge parts are each mountable to adjacent structures.

3. A fluid proof hinge as in claim 1, wherein the pin member is made of metal.

4. A fluid proof hinge as in claim 1, wherein the flange portion is biased against the receiving portion when the hinge is in a generally planar configuration.

5. A fluid proof hinge as in claim 1 wherein the first and second hinge parts are made from urethane.

6. A fluid proof hinge as in claim 3 wherein the pin member is composed of stainless steel.

7. A fluid proof hinge as in claim 4, wherein the flange is more strongly biased against the receiving portion as the hinge is articulated in the direction of the flange.

8. A fluid feed control device comprising:

a feed box having a fluid inlet and a fluid outlet located on a bottom of the feed box;

a fluid passageway connected to the outlet of the box, the passageway being defined by a stationary wall, a pair of side walls, and a control wall, the control wall having a fixed portion and an articulating portion connected to the rigid portion at one edge such that when an opposite edge of the articulating portion contacts the stationary wall, the passageway is closed, the rigid portion being operatively connected to the articulating portion by a hinge, the hinge comprising:

a first hinge part having first and second longitudinal ends, a top edge portion, a bottom edge portion, a front face and a back face, a plurality of alternating protrusions and slots defined along the bottom edge portion, and a flange portion integrally formed in one piece with said first hinge part so as to depend from the bottom edge portion, adjacent the protrusions and slots, said first hinge part, including said flange portion, being integrally formed in one piece from an elastomeric material, said first hinge part and flange both being of the same elastomeric material;

a second hinge part having first and second longitudinal ends, a top edge portion, a bottom edge portion, a front face and a back face, a plurality of alternating protrusions and slots defined along the top edge portion, the top edge having a recess defined therein along the top edge portion adjacent the protrusions and slots, the second hinge part being integrally formed in one piece from an elastomeric material; and a pin member connecting the alternating protrusions of the first and second hinge parts, such that when the first and second hinge parts are connected by the pin member the flange portion of the first hinge part sealingly contacts the receiving portion of the second hinge part so as to define a seal therebetween, the first hinge part being mounted to the rigid portion of the central wall, the second hinge part being mounted to the articulating portion so as to provide a fluid proof articulable connection between the rigid portion and the articulating portion.

9. A fluid feed control device as in claim 8, wherein the first and second hinge parts each further comprise a plurality of mounting holes whereby the first and second hinge parts are each mountable to adjacent structures.

10. A fluid feed control device as in claim 8, wherein the first and second hinge parts are formed from urethane so as to fluid tightly engage said fixed portion and said articulating portion of the control wall, respectively.

11. A fluid feed control device as in claim 8, wherein the pin member is made of stainless steel.

12. A fluid feed control device as in claim 8, wherein the flange portion is biased against the receiving portion when the hinge is in a generally planar configuration.

13. A fluid feed control device as in claim 12, wherein the flange is more strongly biased against the receiving portion as the hinge is articulated in the direction of the flange.

* * * * *